(12) United States Patent
Royster

(10) Patent No.: US 7,196,779 B2
(45) Date of Patent: Mar. 27, 2007

(54) SIGHT ADJUSTER

(76) Inventor: Daniel R. Royster, 580 Kralltown Rd., Wellsville, PA (US) 17365

( * ) Notice: Subject to any disclaimer, the term of this patent is extended or adjusted under 35 U.S.C. 154(b) by 307 days.

(21) Appl. No.: 10/992,194

(22) Filed: Nov. 18, 2004

(65) Prior Publication Data
US 2006/0103834 A1 May 18, 2006

(51) Int. Cl.
G01C 3/36 (2006.01)
(52) U.S. Cl. .................... 356/28; 356/616; 356/400
(58) Field of Classification Search ................ 356/28
See application file for complete search history.

(56) References Cited

U.S. PATENT DOCUMENTS

| 3,792,354 | A |   | 2/1974  | Slaght et al. |         |
|-----------|---|---|---------|---------------|---------|
| 3,824,463 | A | * | 7/1974  | Oehler        | 324/179 |
| 4,128,761 | A |   | 12/1978 | Oehler        |         |
| 4,239,962 | A |   | 12/1980 | Oehler        |         |
| 4,845,690 | A |   | 7/1989  | Oehler        |         |
| 5,349,853 | A |   | 9/1994  | Oehler        |         |
| 5,577,733 | A |   | 11/1996 | Downing       |         |
| 5,988,645 | A | * | 11/1999 | Downing       | 273/348 |
| 6,020,594 | A | * | 2/2000  | Tschudi       | 250/559.32 |
| 6,198,694 | B1| * | 3/2001  | Kroling et al.| 367/127 |
| 6,414,747 | B1| * | 7/2002  | Hardy         | 356/28  |
| 2003/0082502 | A1 |  | 5/2003 | Stender       |         |

* cited by examiner

Primary Examiner—Thomas H. Tarcza
Assistant Examiner—Timothy Brainard
(74) Attorney, Agent, or Firm—Mary Howard Powell

(57) ABSTRACT

The present invention provides a sight adjuster for a velocity measurement system for sighting a projectile. A velocity measurement unit has a front sensor area and a back sensor area, and the sight adjuster has a front panel with a sighting bore such that the front panel is for positioning in the front sensor area of the velocity measurement unit, and the sight adjuster has a back panel for positioning in the back sensor area of the velocity measurement unit, and a light projects through the front panel sighting bore to strike the back panel.

22 Claims, 4 Drawing Sheets

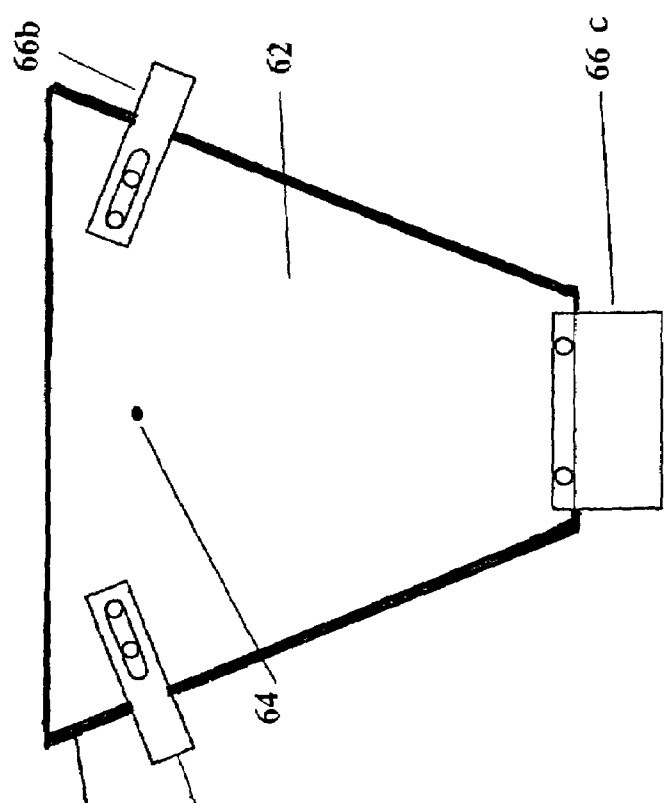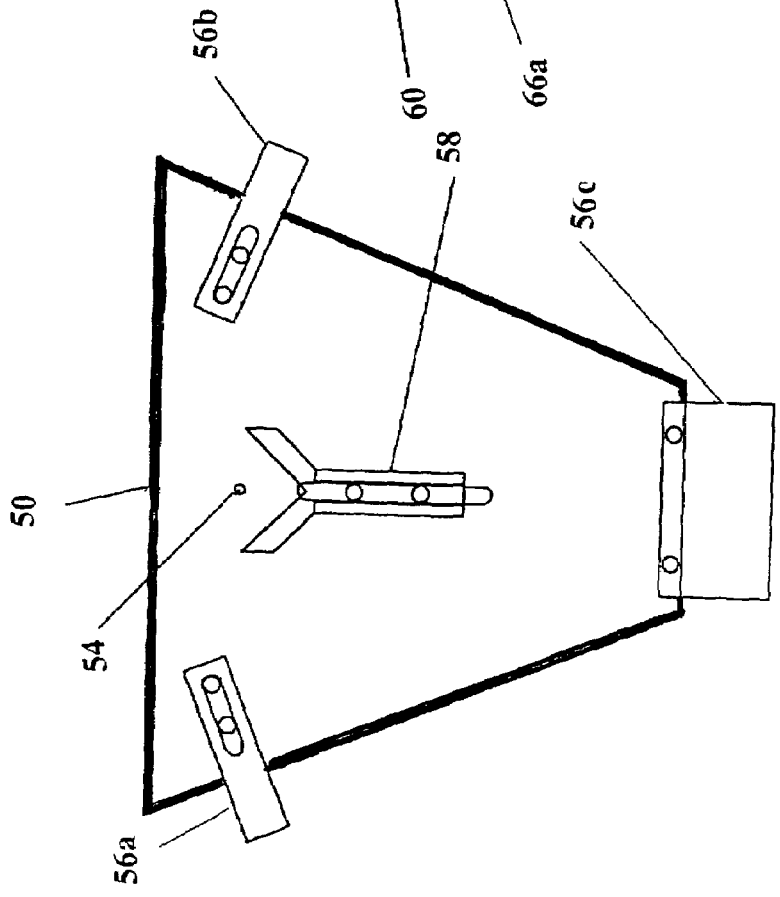

SIGHT ADJUSTER

FIELD OF THE INVENTION

The present invention relates to an improved method of sighting a projectile to traverse the sensory areas of an electronic velocity measurement unit.

BACKGROUND

The present invention relates generally to a novel method of adjusting the sighting for a velocity measurement system wherein efficient use of the velocity measurement system is enhanced since time, resources and effort involved in proper use of a velocity measurement unit is reduced.

For years, avid sportsmen and other individuals engaged in activities involving projectiles have shown an interest in the speed-reading of projectiles and in quantifying the velocity of projectiles. Velocity measurement systems serve a purpose of measuring the velocity of projectiles. Generally, computerized velocity measurement systems measure the velocity of a projectile in a portion of the projectile's trajectory. Projectile velocity is deemed an important criterion in the shooting art and is taken into account when aiming or sighting a projectile launched from a trajectory guide.

By way of example and not limiting the scope of the present invention, sporting rifle shooters often use velocity measurement units referred to as chronographs. Not long ago, chronographs experienced limited demand and availability since initially they were pricey, difficult to handle and difficult to use. Currently chronographs are readily available, affordable and often fold into compact, portable units. The present invention resolves a primary hurdle that continued to exist before now and wedged potential demand for chronographs and current market demand for chronographs.

A velocity measurement system determines an elapsed time of a projectile between spaced intercepts along a portion of the projectile's trajectory. That is, a velocity measurement system operates on the principle of measuring the transit time of an object traveling from a first photo sensor to a second photo sensor. The general class of velocity measurement systems for which this invention relates uses an electronic velocity measurement unit having at least two photo sensors separated by a predetermined trajectory path distance. The photo sensors are aligned orthogonally with respect to the projectile's trajectory. The first of such photo sensors is located at the front of the velocity measurement unit and the second photo sensor is located at the back of the velocity measurement unit.

The photo sensors detect the passage of a projectile by sensing the change in the amount of light, the momentary change in light intensity. The photo sensors are mounted in a velocity measurement unit. The two photo sensors gather light through two respective and associated windows in the top of the velocity measurement unit. The photo sensors, respectively, detect light directly above for a finite distance. Light blockage caused by a projectile passing over the photo sensors is converted to a signal detected by the velocity measurement unit. The elapsed time between the photo sensors is converted to velocity and the velocity measurement unit displays the velocity measurement.

While computerized velocity measurement systems have the capability to inform regarding the velocity of projectiles—including identifying the slowest projectile in a string of projectiles, the fastest projectile in a string of projectiles, the average velocity of any string of projectiles, the extreme spread and the standard deviation of velocity—such information is available only if the projectile properly passes the photo sensors of the velocity measurement system. That is, a substantial amount of quantified information is available to the velocity measurement system user upon accurate use of the velocity measurement system. Before the sight adjuster of the present invention, the effectiveness of a computerized velocity measurement system significantly depended on the skill of the user launching a projectile. One's ability to aim a trajectory guide adequately for launching a projectile across sensory areas along a course pre-selected by the velocity measurement unit profoundly impacts one's use and enjoyment of a velocity measurement system.

The prior art teaches that successfully obtaining a projectile's velocity is a particularly tedious task since numerous variables associated with the task include considering the specific projectile trajectory guide, the specific projectile and its features, change in slope over the portion of the projectile's trajectory involved in a velocity measurement. In particular, before the present invention, level surfaces were encouraged for effective use of most electronic velocity measurement systems. The variables involved in using a velocity measurement system often impede the effectiveness of the velocity measurement system and result in factor errors. The results of improper sighting of a velocity measurement system include factor errors when the shadow of a projectile crosses only one photo sensor, "no readings" when the projectile crosses none of the photo sensor areas and incorrect velocity measurements when an improper sensory area is crossed by the projectile.

An easy method for using the typical computerized velocity measurement systems has eluded the marketplace. There have been numerous attempts to solve this quandary, however, until now there has not been a definitive solution. The prior art is composed of products that are ineffective, inefficient, cumbersome, costly to produce, highly technical, complicated, extensively time consuming to use, limited in use, costly to use and lacking practical application.

The prior art is limited and the present invention is an alternative to the prior art.

SUMMARY OF THE INVENTION

The present invention is a sight adjuster for a velocity measurement unit having a front sensor area and a back sensor area, wherein the sight adjuster comprises a front panel, a back panel and a light projector. The front panel has a sighting bore and the front panel is positioned in the front sensor area of the velocity measurement unit. The back panel is positioned in the back sensor area of the velocity measurement unit. The light projects from a trajectory guide through the front panel sighting bore to strike the back panel.

BRIEF DESCRIPTION OF THE DRAWINGS

FIG. 5 is a plan elevational view of a preferred embodiment of a front panel of the present invention in FIG. 1, wherein the front panel has one or more attachments for securing the front panel to the velocity measurement unit of the velocity measurement system.

FIG. 6 is a plan elevational view of a preferred embodiment of a back panel of the present invention in FIG. 1, wherein additionally the present invention having one or more attachments attached to the back panel for securing the back panel to the velocity measurement unit of the velocity measurement system.

DESCRIPTION OF A PREFERRED EMBODIMENT

Figure 1:
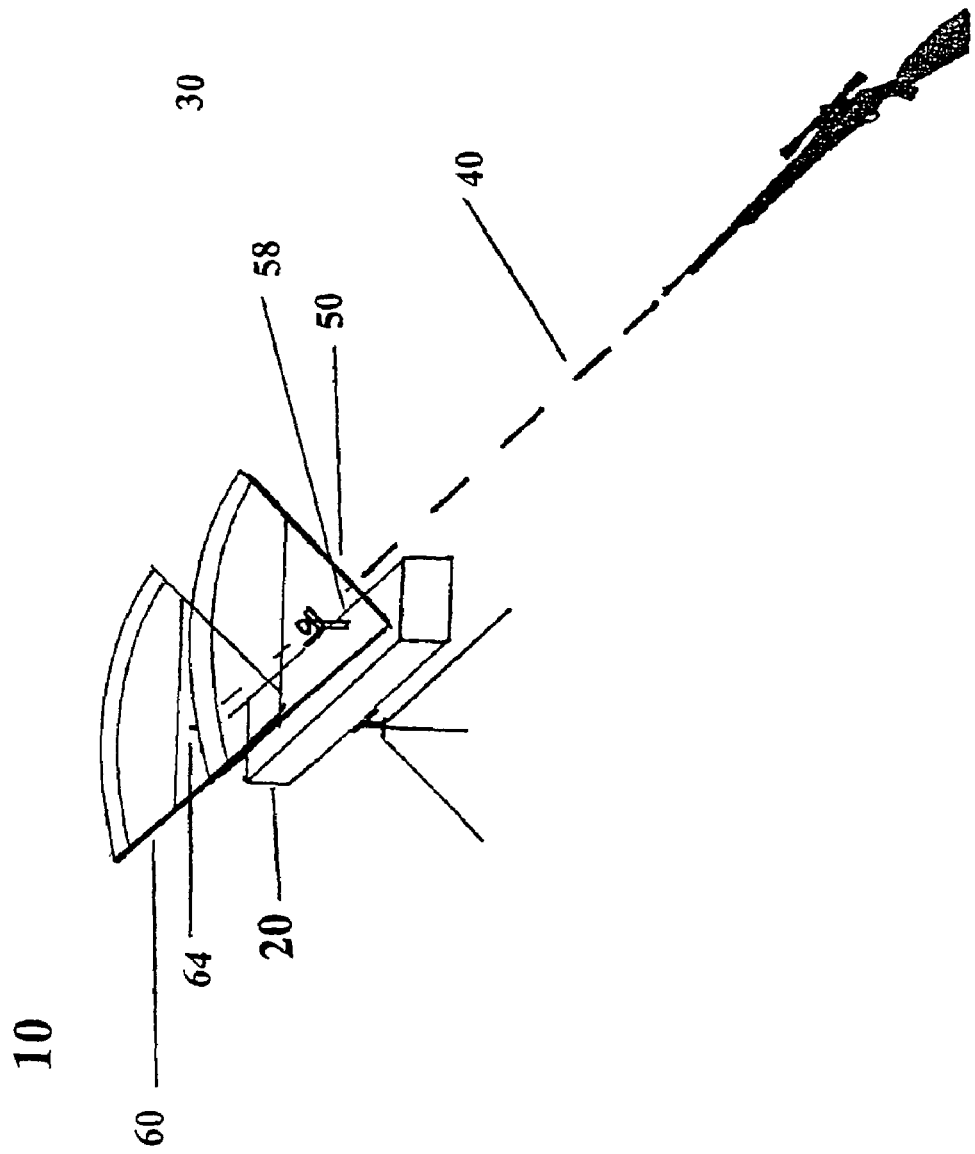
FIG. 1 is a perspective view of a preferred embodiment of a velocity measurement system according to the present invention, in relation to a projectile's trajectory path outlined by a light beam projected from a laser positioned in a trajectory guide, wherein the trajectory guide is a firearm and the light beam may traverse at least two photo sensors of a velocity measurement unit and pass through a sighting bore of a front panel to strike an indicia of a back panel.

The present invention is a sight adjuster 30 for a velocity measurement system 10, the sight adjuster 30 having a light projector 40, a front panel 50 and a back panel 60. The present invention may be used to assist in reducing the sighting set-up time of a velocity measurement system 10 such as a chronograph 10 used to measure the velocity of moving projectiles launched from trajectory guides such as rifles, pistols, arrows, shotguns, pellet guns and paintball guns.

By way of examples and not restricting the scope of the present invention, the Chrony™ chronograph and the ProChrono™ chronograph are electronic velocity measurement systems. The ProChrono™ has two photo sensors located inside its oblong velocity measurement unit. Two windows in the top of the ProChrono™ expose the photo sensors. The photo sensors detect light and the blocking of light above the photo sensors for a finite distance. The two photo sensor windows are located generally in the front and back of the chronograph, respectively, horizontally positioned across the width of the chronograph and sized compatible to the length of the photo sensors. Each photo sensor window is approximately 2.7 centimeters in length, having a respective width of approximately 0.3 centimeters. The trajectory path distance of the ProChrono™ separating the two photo sensors that a projectile traverses is approximately 34 centimeters. An electronic circuit calculates projectile velocity based upon the trajectory path distance and the projectile's transit time.

The ProChrono™ is designed to accommodate four aiming rods, one aiming rod on either outside of the length of a photo sensor window. Each aiming rod extends upright approximately 25 centimeters from generally the top of the velocity measurement unit. The photo sensors of the ProChrono™ sense light and blockage of light by detecting momentary changes in light intensity in the area immediately above the windows. The photo sensors are limited in their ability to sense beyond the area between the aiming rods that is directly above the windows.

The Chrony™ chronograph operates similar to the ProChrono™ chronograph. The Chrony™ has two photo sensors located generally on the front and back of the oblong unit, approximately 32 centimeters apart. Each of the photo sensors is approximately 2.5 centimeters in length, having a respective width of approximately 0.3 centimeters. As with the ProChrono™, the Chrony™ has aiming rods, photo sensors horizontally positioned across the width of the chronograph and is limited in its ability to sense outside the area between the aiming rods that is directly above the photo sensors.

The velocity measurement system 10 of the present invention includes a velocity measurement unit 20. The velocity measurement unit 20 operates on the principle of measuring the transit time, that is, the elapsed time of an object traveling from a forward first photo sensor area to a rear second photo sensor area, or perhaps from a first photo sensor to a third or fourth photo sensor, or perhaps from a second photo sensor to a third photo sensor, for examples. The general class of velocity measurement systems for which this invention relates uses at least two photo sensors separated by a predetermined trajectory path distance and aligned orthogonally with respect to the projectile's trajectory. The velocity measurement unit 20 has at least a front photo sensor 22 located in a front sensor area 24 of the velocity measurement unit 20 and a back photo sensor 26 located in the back sensor area 28 of the velocity measurement unit 20, the front photo sensor 22 and the back photo sensor 26 being substantially parallel one to the other. Additional interim photo sensors may be arranged sequentially between the front photo sensor 22 and the back photo sensor 26 for interim velocity detection.

Figure 2:
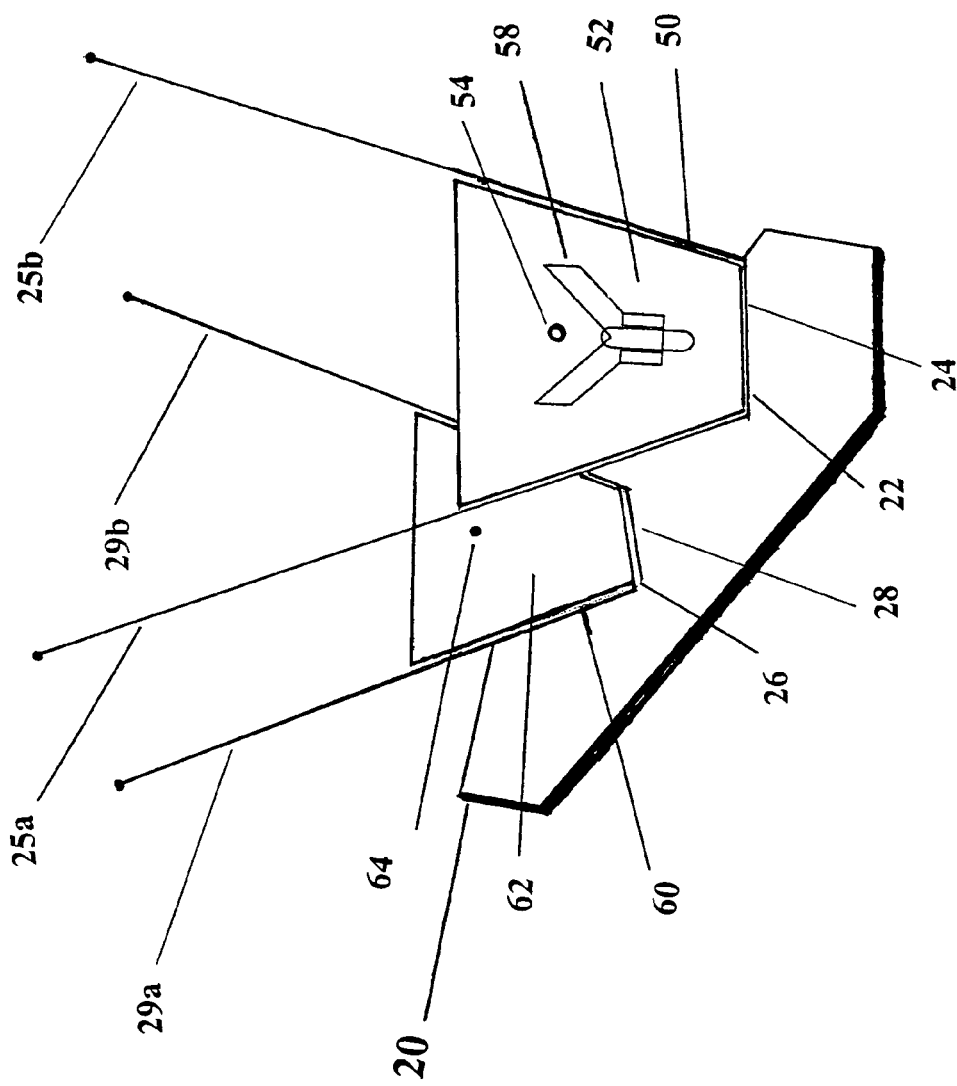
FIG. 2 is a perspective view of a preferred embodiment of a velocity measurement unit according to the present invention, wherein the velocity measurement unit has at least a front photo sensor and a front panel in a front sensor area, a back panel and a back sensor area and four aiming rods.

According to the embodiment shown in FIG. 2, the velocity measurement unit 20 is adapted to accommodate two aiming rods 25a, 25b on either side of the front sensor area 24 and two aiming rods 29a, 29b on either side of the back sensor area 28. The aiming rods 25a, 25b are substantially in the same vertical plane and extend upward and outward from the velocity measurement unit 20 to fan away from each other. The aiming rods 29a, 29b are substantially in the same vertical plane and extend upward and outward from the velocity measurement unit 20 to fan away from each other.

The embodiment of the present invention at FIG. 1 and FIG. 2 show the front panel 50 of the sight adjuster 30 positioned and centered in proximity to the front photo sensor 22 and the back panel 60 positioned and centered in proximity to the back photo sensor 26. The front panel 50 has an entry side 52 and a circular sighting bore 54 at a horizontal midpoint on the front panel 50. The sighting bore 54 has a diameter measuring approximately 0.5 centimeter to accommodate a 23 caliber laser 40. Preferably the diameter of the sighting bore 54 is at least fifty percent smaller than the diameter of the trajectory guide and the laser 40 is sleeved in a shell adequately sized for the trajectory guide. The back panel 60 has a target side 62 with an indicia 64 marked at a point in direct correspondence to the front panel sighting bore 54. In the embodiment shown in FIG. 2, the indicia 64 may be a horizontal midpoint of the back panel target side 62. The front panel 50 and the back panel 60 may be made of a variety of materials including, and not limited to, polymeric material, wood, paper, metal, leather, cloth and a combination thereof, and may be durable or disposable. The front panel 50 and back panel 60, respectively, may be a dark color, perhaps a black matte coloring. The front panel 50 and the back panel 60, respectively, may have a durable or disposable coordinate or target grid for coordinate identification with the front panel sighting bore 54 and the back panel indicia 64, respectively, being identified by the coordinates (0,0), a target "bull's eye" or similar identification 20. The front panel 50 and back panel 60, respectively, are sized to minimize obstruction of visibility outside the velocity measurement unit 20, perhaps sized to correspond to the area separating the aiming rods 25a, 25b.

In the embodiments shown in FIG. 5 and FIG. 6, the front panel 50 and back panel 60, respectively, may be attached to the velocity measurement unit 20 with respective front panel attachments 56a, 56b, 56c and back panel attachments 66a, 66b, 66c. The panel attachments 56a, 56b, 56c, 66a, 66b, 66c may be made of metal, polymeric material, sticky paper or mesh looping. The attachments 56a, 56b, 66a, 66b may respectively secure the front panel 50 and the back panel 60 to the aiming rods 25a, 25b, 29a, 29b of the velocity measurement unit 20. The front panel 50 and the back panel 60 may affix to the velocity measurement unit 20 with L-brackets, respectively, 56c, 66c, according to the embodiments shown in FIG. 5 and FIG. 6.

Figure 4:
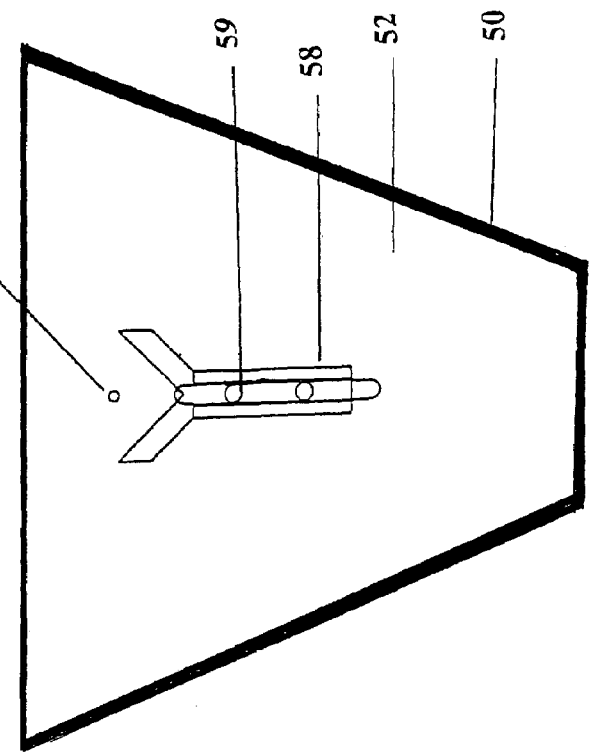
FIG. 4 is a plan elevational view of a preferred embodiment of a front panel of the present invention in FIG. 1, wherein the front panel has a sighting bore and a V-shaped, lockable cradle on a front panel entry side.
Figure 3:
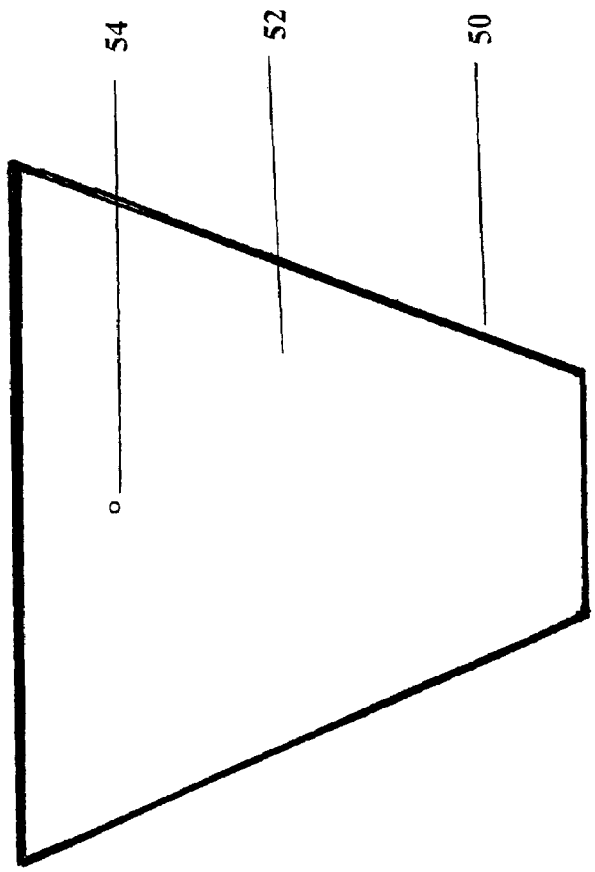
FIG. 3 is a plan elevational view of a front panel of the present invention.

In the embodiment shown in FIG. 4, a slideble, selectively adjustable V-shaped cradle 58 is attached to the entry side 52 of the front panel 50. The cradle 58 assists in recording substantial perpendicular alignment between the sighting bore 54 of the front panel 50 and a trajectory guide. By means of example merely, the cradle 58 may assist in centering the sighting bore 54 of the front panel 50 about a trajectory guide such as a rifle barrel and may be selectively locked into place with a locking mechanism 59 after the rifle barrel is centered about the sighting bore 54. Centering the sighting bore 54 about the trajectory guide prior to positioning the velocity measurement unit 20 for use may lessen sighting errors.

The front panel 50 and the back panel 60 are positioned in the front sensor area 24 and the back sensor area 28, respectively, of the velocity measurement unit 20.

The light projector 40 is positioned to emit at least one light beam through the trajectory guide to extend through the front panel sighting bore 54 to strike the back panel 60. The light projector 40 may emit a light selected from the group consisting of incandesce lighting, infrared, solar lighting, visible light and ultraviolet. In particular, the light projector 40 may be a laser 40. In addition, the light projector 40 may emit more than one light beam and the multiple light beams may be the same or of different colors.

The front panel 50, while positioned in the front sensor area 24 of the velocity measurement unit 20, is butted against the trajectory guide such that the light beam from the laser 40 projects through the front panel sighting bore 54 to strike the back panel 60. This step may involve adjusting the height and lateral position of the velocity measurement unit 20 and may be accommodated by placing the velocity measurement unit 20 on a base such as a tripod having adjustable legs and a swirl-threaded "neck" connection. Vertical, spread movement of the legs of the tripod relay vertical movement to the velocity measurement unit 20. The swirl, horizontal movement of the "neck" connection relay horizontal movement to the velocity measurement unit 20.

Alignment of the front panel sighting bore 54 with the back panel indicia 64 refers to adequate alignment of the projectile's trajectory path and the front photo sensor 22 and the back photo sensor 26. Such adequate alignment most readily occurs where the trajectory guide and the velocity measurement unit 20 are positioned on the same level plane. Where the sighting bore 54 is centered about the trajectory guide and the light projector 40 is not aligned sufficiently to strike the indicia 64 upon initial positioning of the velocity measurement unit 20 at "point blank/zero range" of the trajectory guide, such lack of alignment may result from positioning the velocity measurement unit 20 downrange, up-range or on an un-level surface relative to a launch position for a projectile's trajectory guide.

The strike may be recorded on the target side 62 of the back panel 60 with a pencil, pen, chalk, glue-backed paper, re-usable paper markers, color-coded re-useable makers and similar products. The corresponding angular alignment between the front panel 50 and the trajectory guide identified by the strike, in essence, transfers the angularity of the projectile's trajectory path of the projectile to the velocity measurement unit 20 and may assist in an adequate use of the velocity measurement system 10.

The velocity measurement unit 20 is moved an appropriate distance from the trajectory guide. For numerous velocity measurement units, the safe and effective distance away from the trajectory guide for use of the velocity measurement unit 20 is approximately two meters to six meters, depending on the relevant considerations. The beam from the light projector 40 remains projected onto the front panel 50 during the movement of the velocity measurement unit 20 to assist simplifying sighting of the velocity measurement unit 20.

Adjust the velocity measurement unit 20 wherein the laser 40 projects light a second time through the front panel sighting bore 54 to form a second strike on the back panel 60. The velocity measurement unit 20 is shifted to position the first strike of the back panel 60 to intersect the light beam projected on the back panel 60 by the laser 40 the second time. Shifting of the first strike to the second strike of the laser 40 automatically creates a translated midpoint for the back panel 60 since the indicia 64 on the back panel 60 and the first strike on the back panel 60 are in a constant relationship. The translated midpoint for the back panel 60 is observed and the velocity measurement unit 20 is shifted to position the first strike on the back panel 60 to the translated midpoint on the back panel 60, which positions the front sensor area 24 and the back sensor area 28 of the velocity measurement unit 20 for the projectile to launch from the trajectory guide and traverses the front photo sensor 22 and the back photo sensor 26.

After the trajectory guide and the back panel 60 are properly aligned, remove the laser 40 from the trajectory guide, and remove the front panel 50 and the back panel 60 from the velocity measurement unit 20.

The present invention may be further understood upon a review of the angular relationship supporting the present invention by way of examples. Consider the example of a trajectory guide and a chronograph 20 with a sight adjuster 30, wherein the trajectory guide and the chronograph 20 are positioned on the same level plane and there is parallel alignment between the trajectory guide and the chronograph 20. Upon perpendicularity between the sighting bore 54 and the projectile's trajectory guide, a projectile sighted as such to traverse a centered (midpoint) front panel sighting bore 54 and cross a front photo sensor 22 of the chronograph 20 is also sighted to strike a centered (midpoint) indicia 64 in the back panel 60 of the sight adjuster 30 and cross the back photo sensor 26 of the chronograph 20. Where the trajectory guide and the photo sensors 22, 26 are positioned in different planes due to un-level terrain and horizontal parallel alignment and/or vertical parallel alignment do/does not exist, the trajectory guide will launch the projectile through a trajectory path having a trajectory angle and may result in the back panel 60 being struck at a point other than the indicia 64 which is centered above the back photo sensor 26 at a midpoint on the back panel 60.

The present invention simplifies compensating for the angle of trajectory.

By way of example only, there are five points that may be considered on the back panel 60. On a level surface, the projected light beam may penetrate the front panel sighting bore 54 and strikes the indicia 64 (the "point A") located on the back panel 60. At "point blank/zero range" where the front panel 50 abuts the trajectory guide, the sighting bore 54 is perpendicular to the trajectory guide and the front panel 50 and the back panel 60 are positioned parallel to each other and attached to the chronograph 20, the light beam may penetrate the front panel sighting bore 54 to form a first strike on the back panel 60 at a position other than the point A (the "point B" a/k/a the "first strike").

The relationship between point A and point B is constant. At a useful position and range for the chronograph 20 of perhaps two meters to six meters from the trajectory guide, with said useful position being parallel to and a position on the axis of the trajectory guide identifiable when the chronograph 20 is at "point blank/zero range", the light beam may penetrate the front panel sighting bore 54 to contact the back panel 60 at a position other than the point A or point B (the "point C"). At the useful position and range for the chronograph 20 where point C is identified, the laser 40 projecting the light beam and the legs of the tripod remain stationary while the chronograph 20 is sufficiently tilted vertically and horizontally for alignment of the first strike (point B) with the beam of the laser 40 (point C). Thus, the chronograph 20 is tilted to move the first strike (point B) on the back panel into the trajectory path of the light beam on the back panel (point C), to identify point C as the "point B'".

As a consequence of tilting the chronograph 20 in order to move the first strike (point B) into the path of the light beam (point C) referred to herein as point B', point A experiences translatory shifting since there is a constant relationship between point A and point B. This consequential shifting of point A results in identifying a pair of coordinates referred to herein as the "point A'". Maintaining the stationary legs of the tripod, the chronograph 20 may be further adjusted to shift the point B' to the observed point A'. The front panel sighting bore 54 represents a center area for the front photo sensor 22 and the point A' represents a center area for the back photo sensor 26.

The sight adjuster 30 diminishes the time, resources and effort required for effective use of a chronograph 20 by simplifying the sighting process. In order to properly use a chronograph 20, a user must sight the front sensor area 24, cross the front photo sensor 22 with the projectile, sight the back sensor area 28 and cross the back photo sensor 26 with the projectile. In instances of un-level terrain, before the present invention a chronograph 20 generally required numerous adjustments for effective sighting.

Other embodiments, variations and ordering of the steps of the methods of use within the scope of the present invention are understood by those knowledgeable regarding the art.

The invention claimed is:

1. A sight adjuster for a velocity measurement unit for sighting a projectile launched from a trajectory guide, the velocity measurement unit having a front sensor area and a back sensor area, wherein the sight adjuster, comprising:
   a front panel having a sighting bore, the front panel for positioning in the front sensor area of the velocity measurement unit;
   a back panel for positioning in the back sensor area of the velocity measurement unit; and
   a light projector for emitting light from the trajectory guide through the front panel sighting bore to strike the back panel.

2. The sight adjuster of claim 1, wherein the front panel is made of a material selected from the group consisting of polymeric material, wood, paper, metal, leather, cloth and a combination thereof.

3. The sight adjuster of claim 1, wherein the front panel having an entry side and a selectively adjustable cradle connected to the entry side for positioning the sighting bore in substantial perpendicular alignment with the trajectory guide.

4. The sight adjuster of claim 1, wherein the front panel having an entry side, the front panel entry side having a selectively adjustable and lockable V-shaped cradle connected thereto for positioning the sighting bore in substantial perpendicular alignment with the trajectory guide.

5. The sight adjuster of claim 1, wherein the front panel and the back panel, respectively, having a dark coloring.

6. The sight adjuster of claim 1, wherein the front panel and the back panel each having a respective attachment for attaching the front and back panels, respectively, to the velocity measurement unit.

7. The sight adjuster of claim 1, wherein the light projector is a laser.

8. The sight adjuster of claim 1, wherein the light projector emits more than one light.

9. The sight adjuster of claim 1, wherein the front panel and the back panel, respectively, have a pattern positioned thereon selected from the group consisting of a grid, coordinates and a target.

10. A chronograph for sighting a projectile launched from a trajectory guide, comprising:
    a velocity measurement unit having at least a front sensor area and a back sensor area;
    a front panel with a sighting bore for positioning in the front sensor area of the velocity measurement unit;
    a back panel for positioning in the back sensor area of the velocity measurement unit; and
    a light projector for emitting light from the trajectory guide through the front panel sighting bore to strike the back panel.

11. The chronograph of claim 10, wherein the front panel is made of a material selected from the group consisting of polymeric material, wood, paper, metal, leather, cloth and a combination thereof.

12. The chronograph of claim 10, wherein the front panel having an entry side with a selectively adjustable cradle connected thereto for positioning the sighting bore in substantial perpendicular alignment with a trajectory guide.

13. The chronograph of claim 10, wherein the front panel having an entry side with a selectively adjustable V-shaped cradle connected thereto for positioning
    the sighting bore in substantial perpendicular alignment with the trajectory guide.

14. The chronograph of claim 10, wherein the front panel and the back panel, respectively, having a dark coloring.

15. The chronograph of claim 10, wherein the front panel and the back panel each having a respective attachment for securing the front and back panels, respectively, to the velocity measurement unit.

16. The chronograph of claim 10, wherein the light projector is a laser.

17. The chronograph of claim 10, further comprising an interim sensor area between the front sensor area and the back sensor area and an interim panel for positioning in the interim sensor area.

18. A sight adjuster for a velocity measurement unit measuring the speed of a projectile launched from a trajectory guide, the velocity measurement unit having a front sensor area and a back sensor area, wherein the sight adjuster, comprising:
- a front panel with a sighting bore and an entry side for positioning in the front sensor area of the velocity measurement unit, the front panel entry side having
- a selectively adjustable V-shaped cradle connected thereto for positioning the sighting bore in substantial perpendicular alignment with the trajectory guide;
- a back panel having a target side with an indicia in correspondence to the front panel sighting bore;
- wherein the front panel entry side and the back panel target side, respectively, having a dark matte coloring; and
- a laser projector emitting a beam through the front panel sighting bore to strike the back panel indicia.

19. A chronograph, comprising:
- a velocity measurement unit for measuring the speed of a projectile launched from a trajectory guide, the velocity measurement unit having a front sensor area and a back sensor area;
- a front panel with a sighting bore for positioning in the front sensor area of the velocity measurement unit, the front panel having a selectively adjustable V-shaped cradle connected thereto for positioning the sighting bore in substantial perpendicular alignment with the trajectory guide;
- a back panel having a target side with an indicia in correspondence to the front panel sighting bore;
- a front panel entry side and the back panel target side, respectively, having a dark matte coloring; and
- at least one laser projector emitting a beam through the front panel sighting bore to strike the back panel target side.

20. A method of using a sight adjuster for a velocity measurement system to measure the speed of a projectile released from a trajectory guide, the velocity measurement system having a velocity measurement unit and the velocity measurement unit having a front sensor area and a back sensor area, the steps of the method comprising:
- positioning a front panel with a sighting bore in the front sensor area of the velocity measurement unit;
- positioning in the back sensor area of the velocity measurement unit a back panel; and
- projecting a light beam through the trajectory guide and the front panel sighting bore to form a strike on the back panel;
- positioning the velocity measurement unit for use;
- adjusting the velocity measurement unit wherein the light streams through the front panel sighting bore and contacts the strike on the back panel; and
- further adjusting the velocity measurement unit such that the strike on the back panel is positioned in the back sensor area.

21. The method of using the sight adjuster of claim 20, further comprising the steps of:
- positioning an adjustable cradle attached to an entry side of the front panel wherein the sighting bore is positioned adjacent to and in close proximity to the cradle to form substantial perpendicular alignment between the sighting bore and the trajectory guide
- marking on a target side of the back panel an indicia in correspondence with the front panel sighting bore;
- marking the strike where the light contacts the target side of the back panel;
- positioning the velocity measurement unit for use;
- adjusting the velocity measurement unit such that the light streams through the front panel sighting bore and contacts the strike on the back panel; and
- further adjusting the velocity measurement unit such that the strike on the back panel is positioned in the back sensor area.

22. A method of using a chronograph to measure the speed of a projectile released from a trajectory guide, the steps of the method comprising:
- providing a velocity measurement unit having a front sensor area and a back sensor area;
- adjusting a front panel having entry side and a sighting bore extending through the front panel, the front panel having an adjustable and lockable cradle attached thereto, such that the sighting bore in the front panel is positioned adjacent to and in close proximity to the trajectory guide to form substantial perpendicular alignment between the sighting bore and the trajectory guide;
- recording the perpendicular alignment between the sighting bore and the trajectory guide by locking the cradle into position;
- attaching the front panel in the front sensor area of the velocity measurement unit;
- attaching the back panel to the velocity measurement unit in the back sensor area;
- projecting a light through the trajectory guide and continuing the projection through the front panel sighting bore to form a strike where the light contacts the back panel;
- marking location of the strike on the back panel;
- positioning the velocity measurement unit for use;
- adjusting the velocity measurement unit such that the light beams from the trajectory guide through the front panel sighting bore and contacts the strike on the back panel; and
- adjusting the velocity measurement unit such that the light streams from the trajectory guide through the front panel sighting bore and the strike on the back panel is shifted to the back sensor area.

* * * * *